No. 703,474. Patented July 1, 1902.
W. L. ROSS.
FURNACE.
(Application filed Apr. 30, 1900.)
(No Model.) 5 Sheets—Sheet 3.

WITNESSES:
C. F. Patterson
Ray J. Davenport.

INVENTOR
William L. Ross
PER
Geo. W. Sule
ATTORNEY.

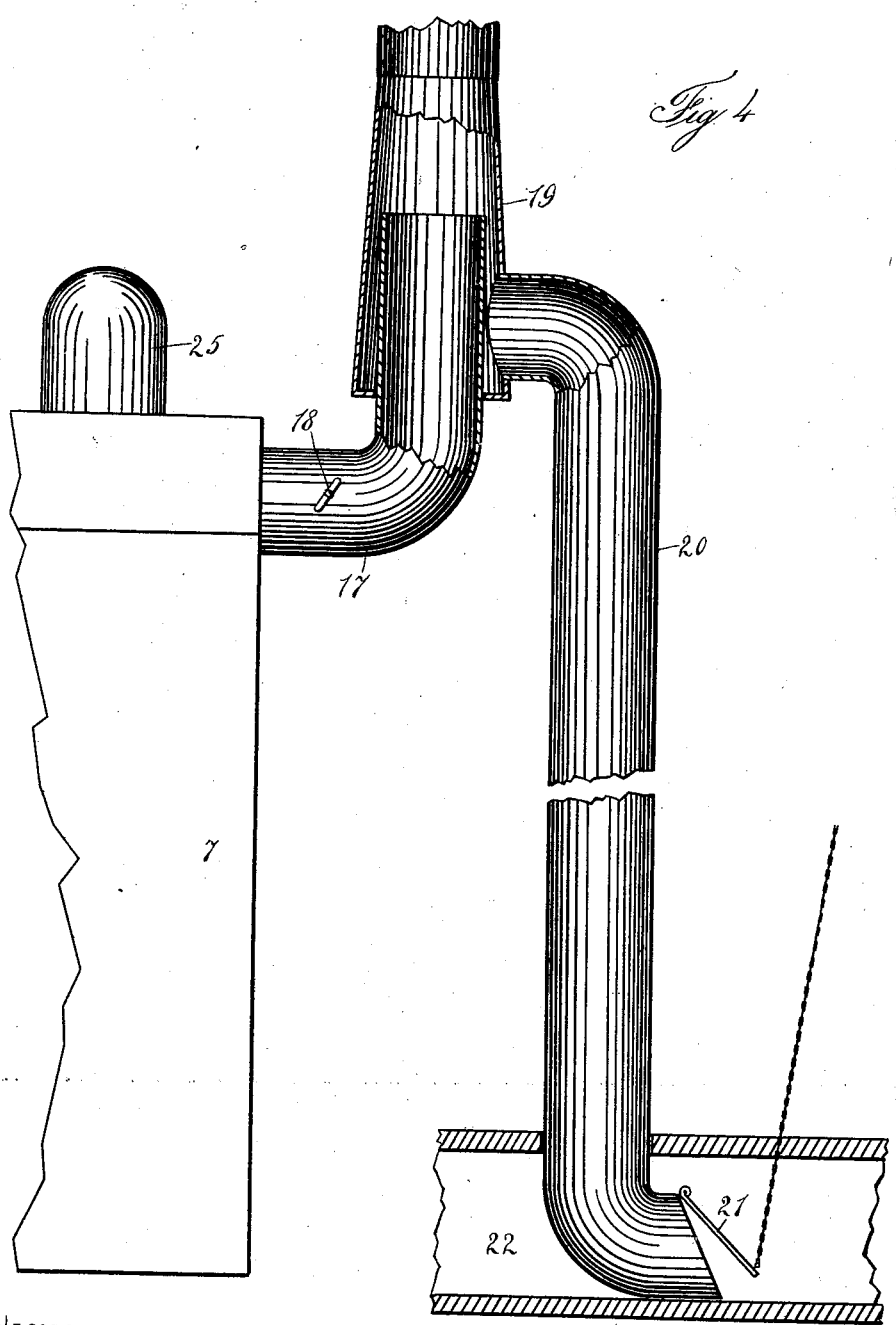

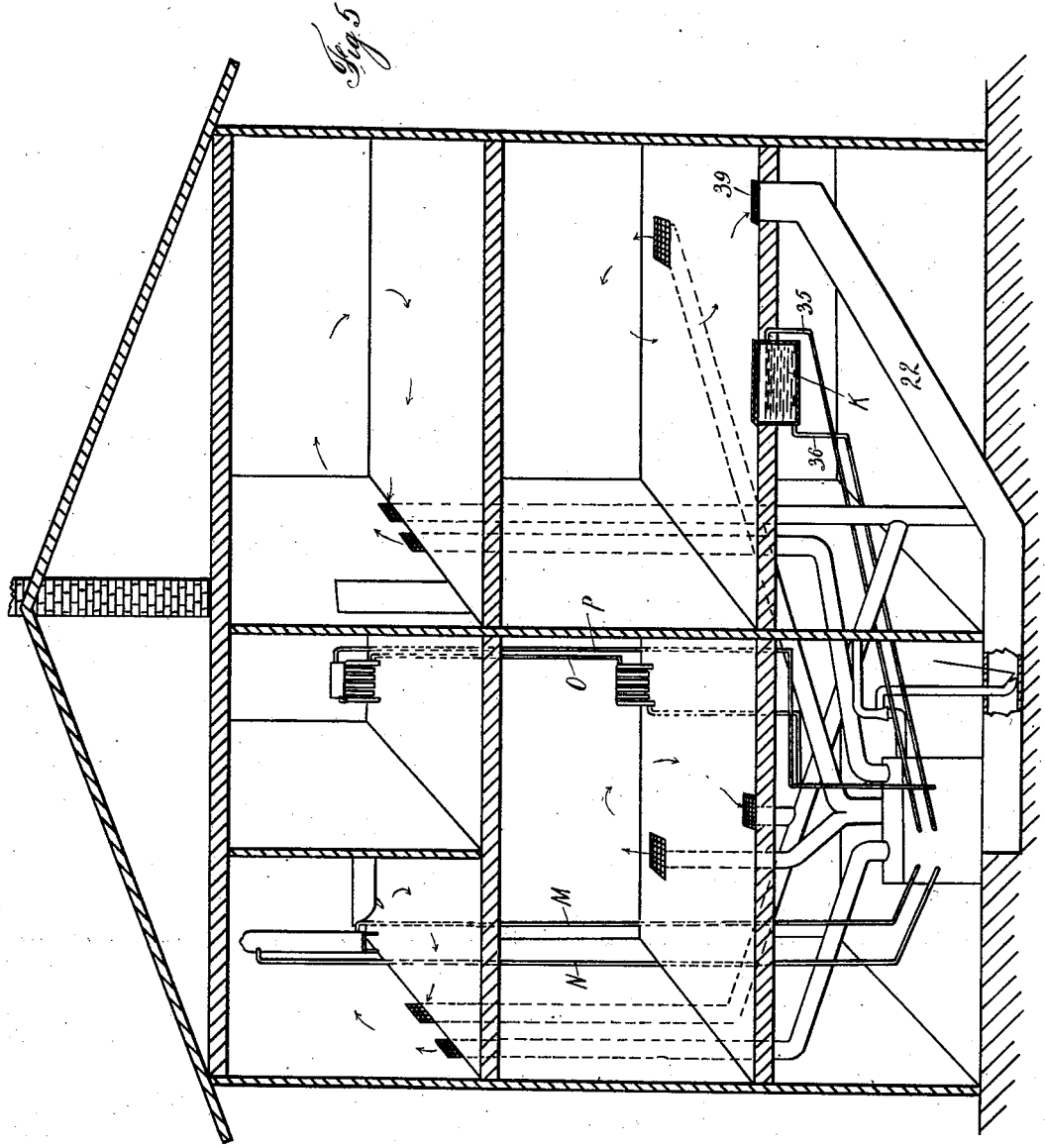

UNITED STATES PATENT OFFICE.

WILLIAM L. ROSS, OF OMAHA, NEBRASKA.

FURNACE.

SPECIFICATION forming part of Letters Patent No. 703,474, dated July 1, 1902.

Application filed April 30, 1900. Serial No. 14,975. (No model.)

*To all whom it may concern:*

Be it known that I, WILLIAM L. ROSS, residing at Omaha, in the county of Douglas and State of Nebraska, have invented certain useful Improvements in Furnaces; and I do hereby declare that the following is a full, clear, and exact description thereof, such as will enable others skilled in the art to which it appertains to make and use the same, reference being had to the accompanying drawings, which form a part of this specification.

This invention has relation to a new and novel improvement in furnaces.

The object of my invention is to provide an air-sterilizing furnace, through the use of which the air passing through the same shall be freed of all living germ life; and my invention embodies certain novel combinations, more fully set forth hereinafter.

Figure 1:
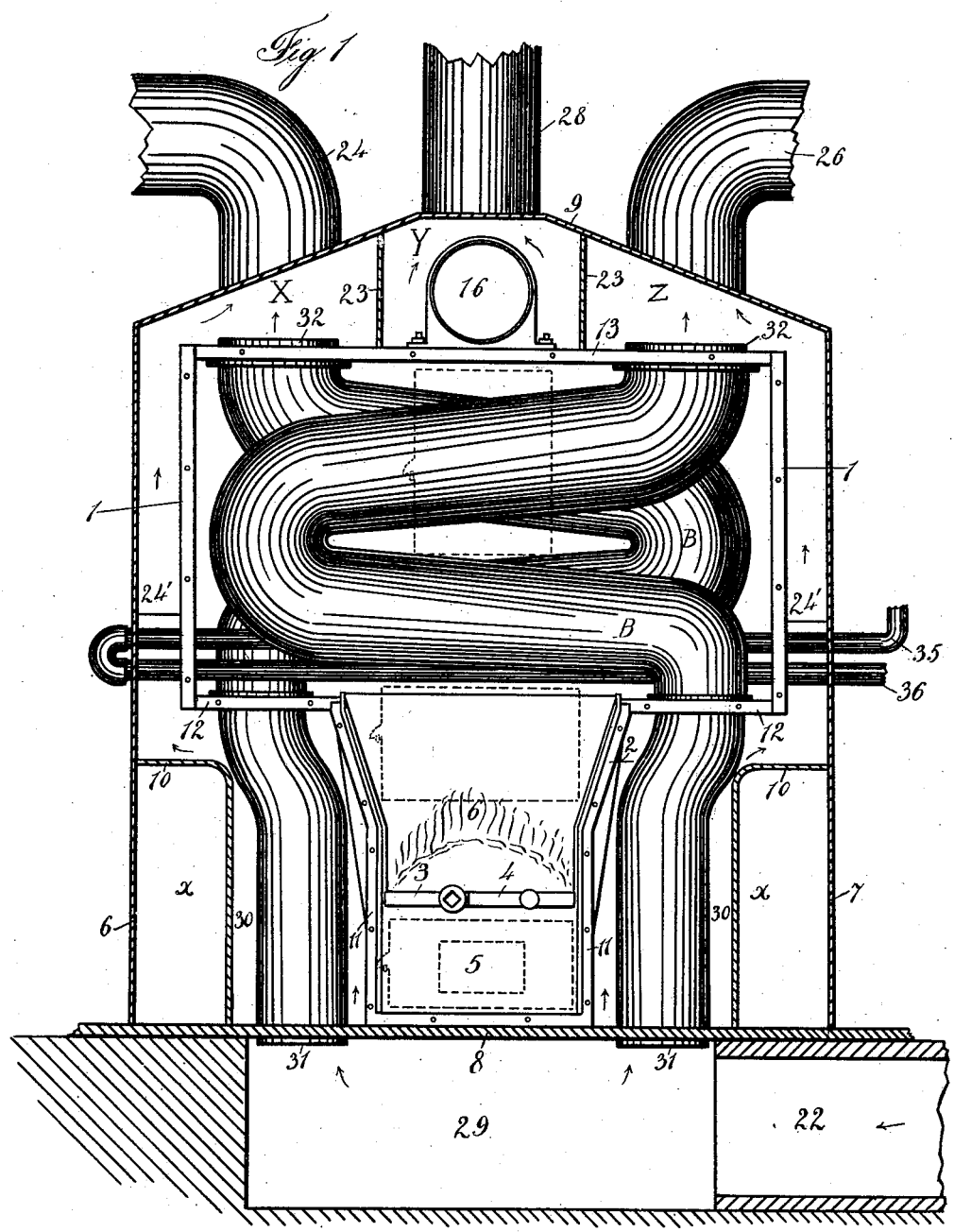
Figure 2:
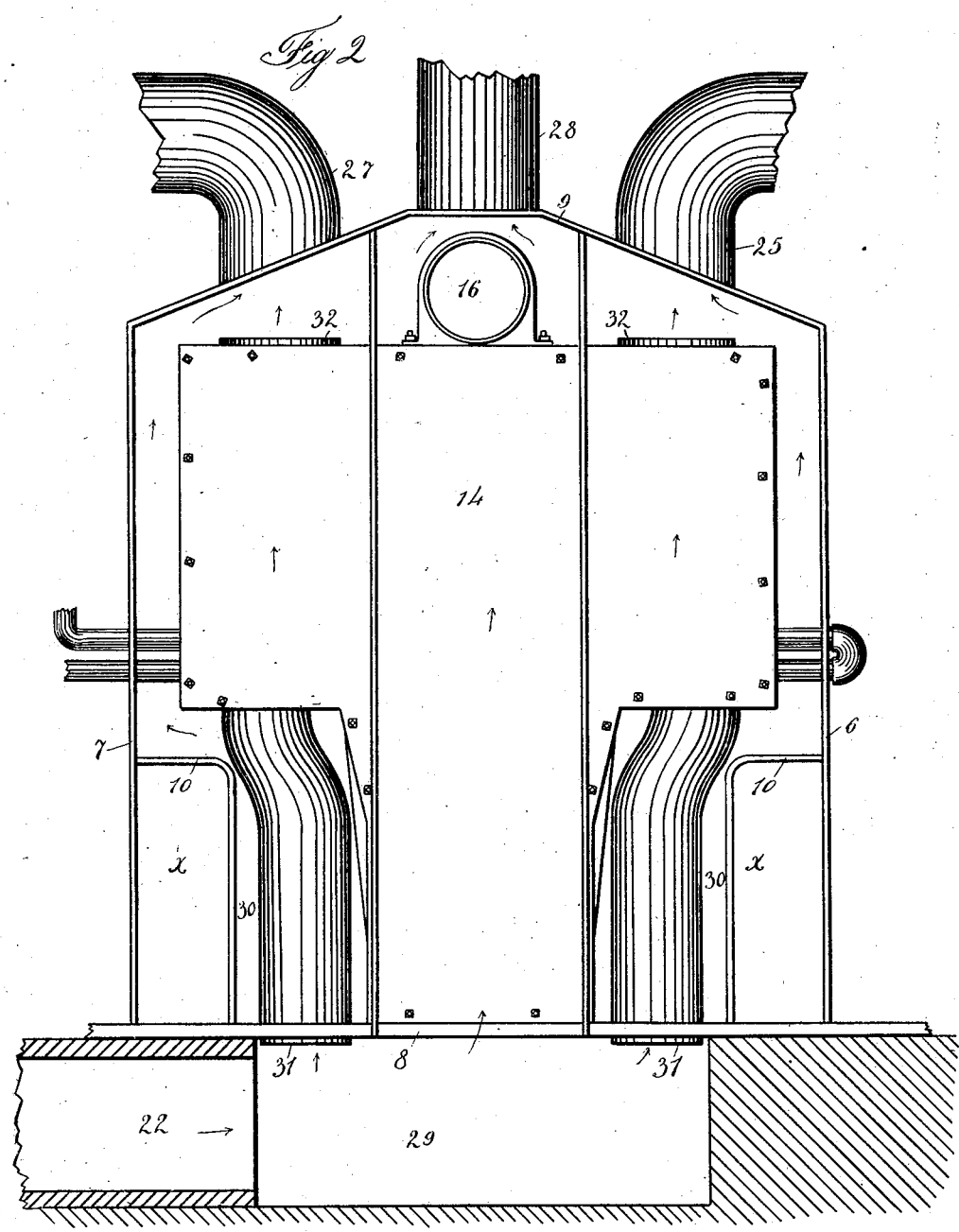
Figure 3:
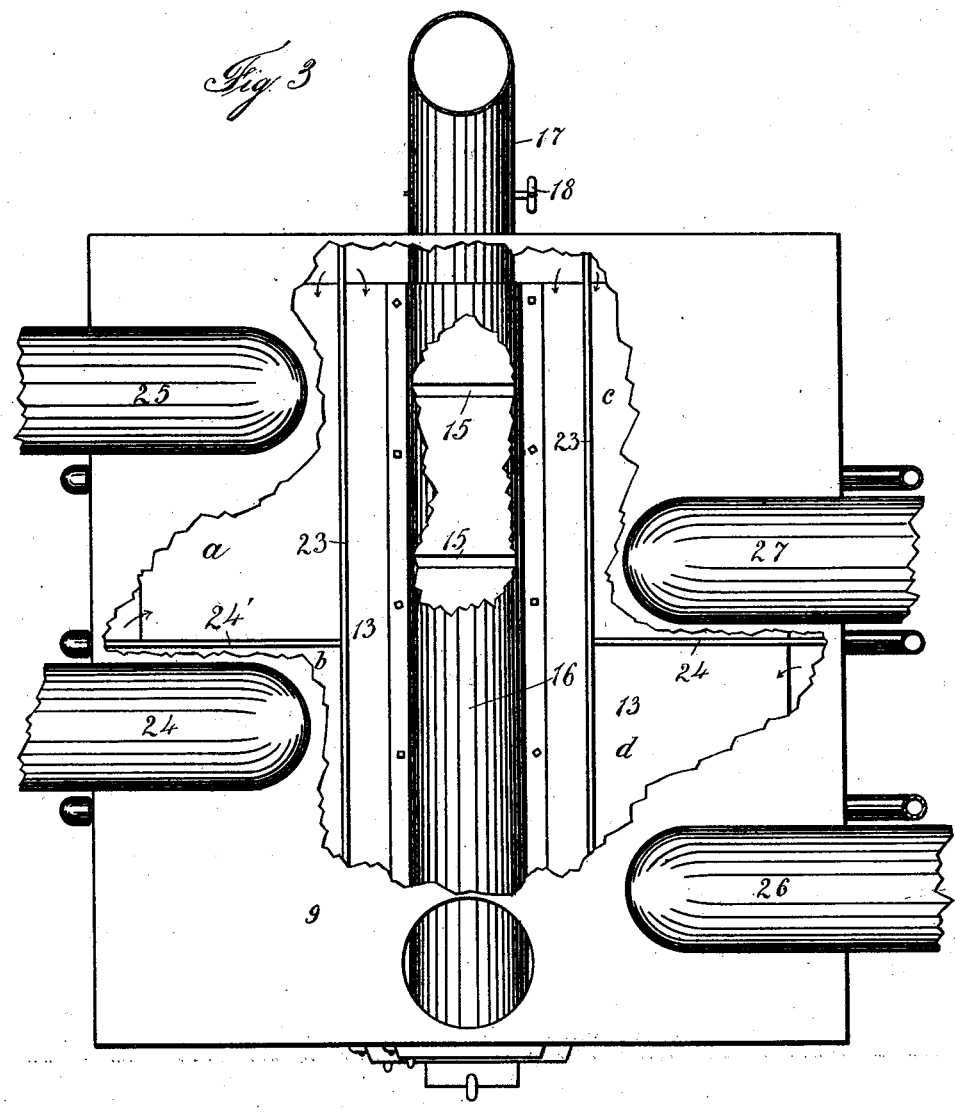

In the accompanying drawings I have shown, in Figure 1, a sectional elevation, with portions removed, of a furnace embodying my invention. Fig. 2 shows a rear view, with the rear plate removed, of one of my furnaces. Fig. 3 discloses a top view of a furnace embodying my invention, with portions removed. Fig. 4 discloses an enlarged broken detached view of the air-inlet as employed in my invention, while Fig. 5 shows an elevation of a dwelling, disclosing the arrangement of my air-sterilizing furnace.

It is well known that all germ life in passing through sterilizing-tubes is killed or rendered inert. In constructing my furnace I have employed this theory, so that the air which is made to circulate through my furnace is sterilized. In accomplishing this result I construct a furnace having the sides 6 7, the bottom 8, and the hood 9. By means of the stub-partitions 10 the furnace is provided upon each side with two elongated chambers *x* lengthwise of the furnace, as is shown in Figs. 1 and 2. Positioned within the furnace are the lower walls 11, which extend upward a suitable distance and form the sides of the ash-pit 5 and fire-pot 6, as shown in Fig. 1, the fire-pot and pit being divided by means of an ordinary divided grate 3 4. This fire-pot and pit preferably extend the full length of the furnace. Branching laterally outward from the upper ends of the sides 11 is the bottom 12, forming an auxiliary combustion-chamber comprising the sides 1 1 and the top 13, so that there is formed an auxiliary chamber of much larger capacity than the fire-pot. The fire-pot upon the rear is closed by means of a plate 14 and in front with a similar plate, having two doors, however, so that the fuel may be fed into the fire-pot 6 and the ashes removed from the ash-pit 5. In Fig. 1 this forward plate has been removed. From this it will be seen that within the furnace-casing proper is a second housing, as described. The top 13 is provided with a number of openings 15, as is shown in Fig. 3, and extending the full length of this top and covering the openings 15 is a dome 16, which communicates with a pipe 17, through which the products of combustion pass in escaping to the chimney. This pipe 17 is provided with an ordinary damper 18, as is shown in Fig. 4.

Surrounding the smoke-pipe 17 is a larger pipe 19, which communicates with an air-supply pipe 20, provided with a valve 21 at the lower end thereof, and this lower end of the air-supply pipe is within an air-duct 22, as will be understood in referring to Fig. 4. It will be noticed that the point of entry of the fresh-air pipe 20 is below the exit-point of the smoke-pipe 17. The forward end of the dome 16 is closed, so that no smoke or gas can escape from this dome 16 into the furnace-casing.

Extending upward from the top 13 to the hood 9 of the furnace are the walls 23 23, so dividing the upper portion of the furnace into three compartments X, Y, and Z, and from these compartments, which extend the full length of the furnace, extend the hot-air-supply pipes 24, 25, 26, 27, and 28, as is shown in Figs. 1 and 3.

Below the furnace I construct a pit 29, into which is led the fresh-air duct 22, and from this duct extend upward the pipes 30, which end below the bottom 12 of the furnace proper and are secured to the collars 31, which in turn are secured air-tight to a plurality of sterilizing-tubes B of increasing capacity, which are approximately U-shaped, having outwardly-flared ends, the upward termination of which are secured to the collars 32, which collars empty alternately into the upper chambers X and Z, as is shown in Fig. 1.

The upper compartment Y upon the rear is also in communication with the lower fresh-air pit 29.

From the description it will be seen that the air-supply tubes 24, 25, 26, and 27 are provided with superheated air mixed with heated air. The heat from the fire started within the fire-pot 6 in rising upward would encircle the sterilizing-tubes B, completely surrounding them, and finally escape through the slotted top 13 of the furnace into the dome 16, where said dome would be heated, the products of combustion finally escaping through the same up the chimney. The air within the sterilizing-tubes as it became heated and rarefied would escape into the compartments X and Z and from thence pass through the feed-pipes connected to said compartments. These compartments X and Z, however, would in addition be in communication with the fresh-air pit 29, so that the sterilized air escaping out of the collars 32 would mix with the warm air and so escape into the feed-pipes. To further utilize the heat of the furnace, I direct one or more water-pipes 35 and 36 through the same, as is shown in Fig. 1.

In order to humidify the air, I provide the building in connection with which my furnace is used with a water-tank K at a suitable point, into which I lead the water-pipe 36, while the pipe 35 also communicates with said tank K, the entry-point of the pipe 36 being much lower than that of the pipe 35, so that as the water within these pipes 35 and 36 within the furnace becomes heated the steam therefrom mingles with the air within the building and so humidifies the same. This hot-water tank is preferably placed within the largest room or hall of the house, and from this room or hall extends the duct 22, as is shown in Fig. 5, where the intake end of this duct 22 is marked by the reference-numeral 39.

From this description it will be seen that the fresh air supplied to the furnace to be sterilized and distributed through the building is not taken from any point exterior to the building, but the air within the building itself is made to circulate again and again, each time being sterilized anew, while added with a certain amount of the atmosphere within the building previously sterilized. From this it will be seen that any germ life within the building which was not rendered inert of the first passing of the air in having possibly passed through the furnace without going through the sterilizing-tubes will, upon a later passage through the furnace, eventually pass through the sterilizing-tubes.

In my furnace the superheated air is cooled by being mixed with air of a lower temperature as it leaves the sterilizing-tubes. Each sterilizing-tube further discharges its air into a separate hood or compartment on the top of the furnace, so that for each section of the house these tubes act in the capacity of a separate furnace, heating the air separately and distinctly for that particular portion of the house to which the air-duct leads.

The escape of gas from the furnace is guarded against by the sterilizing-tubes being cast without a joint or opening, and, further, all the joints or points of union of the separate parts of the furnace are packed with cement and then securely bolted. The dry sterilized air is further supplied with steam from the evaporating-tank K, so that the air is restored to a healthy condition.

The sterilizing of the air in passing and repassing through the tubes keeps the whole atmosphere in the house in such condition that the existence of all germ life in air is kept at a minimum. The further advantage in moistening the air by means of steam is that it tends to cause all germ life to settle within the lowest possible point within the fresh-air-supply duct 22, and the exhaust-pipe 20 is led to the bottom of this duct, as is shown more particularly in 22, so that the heavier gases and particles of air within the fresh-air-supply duct 22 are sucked up and drawn into the smoke-flue, so that the air which is the most vitiated with organic matter and gases is carried entirely out of the building.

The arrangement of the pipes 17 and 19, as is shown in Fig. 4, forms what is known as a "slip-joint," so that the escaping smoke and hot gases from the furnace act as a suction force to draw the vitiated air from the fresh-air duct.

The construction of the instrumentalities of my furnace is to insure a constant automatic ventilation of the house without interfering with the draft of the furnace.

In Fig. 5 I have shown a set of pipes M and N as leading to a hot-water tank and another set of pipes O P as leading to a system of radiators.

Having thus described my said invention, what I claim as new, and desire to secure by Letters Patent, is—

1. In a furnace of the character described, a plurality of open-ended sterilizing-tubes passing through the combustion-chamber, a return air-supply duct communicating with the intake-openings of said tubes, a hot-air chamber receiving the exit ends of said sterilizing-tubes, said hot-air chamber communicating with said return air-supply duct, a draft-flue extending into said return air-supply duct and emptying into the smoke-flue of the furnace, and an evaporating-tank placed adjacent to the intake-opening of said return air-supply duct.

2. The combination in a furnace, of a lower fresh-air pit, a fire-pot, an auxiliary combustion-chamber above said fire-pot, a plurality of hot-air chambers above said auxiliary combustion-chamber, openings leading from said auxiliary combustion-chamber into a smoke-flue, supply-pipes leading from aforesaid hot-air chambers, and a plurality of sterilizing-tubes extending from aforesaid fresh-air-supply pipes and crossing and recrossing within said auxiliary combustion-chamber and finally emptying into aforesaid hot-air chamber.

3. In a furnace, the combination of the lower side air-chambers, of the fire-pot 6, the auxiliary combustion-chamber above said fire-pot 6, the upper hot-air compartments extending from the upper to the lower part of the furnace, the top 13 provided with suitable openings emptying into the duct 16, the fresh-air-supply pit 29 below the furnace, and the sterilizing-tubes B B extending from said pit 29 through the hot-air chambers crossing through the auxiliary combustion-chamber and emptying above into the compartments X and Z as shown.

4. In a furnace of the character described, a plurality of open-ended sterilizing-tubes passing through the combustion-chamber, a return air-supply tube communicating with the intake-openings of said tubes, a plurality of hot-air chambers, each chamber being adapted to receive the exit end of one of said sterilizing-tubes, said hot-air chamber communicating with said return air-supply tube, a draft-flue extending into said return air-supply tube and emptying into the smoke-flue of the furnace, and an evaporating-tank placed adjacent to the intake-opening of said return air-supply tube.

Signed in presence of two witnesses.

WILLIAM L. ROSS.

Witnesses:
GEORGE W. SUES,
CLEMENT F. PATTERSON.